Aug. 21, 1928.  1,681,876
O. PETERSON
TOY PUSHCART
Filed Sept. 14, 1925   2 Sheets-Sheet 1
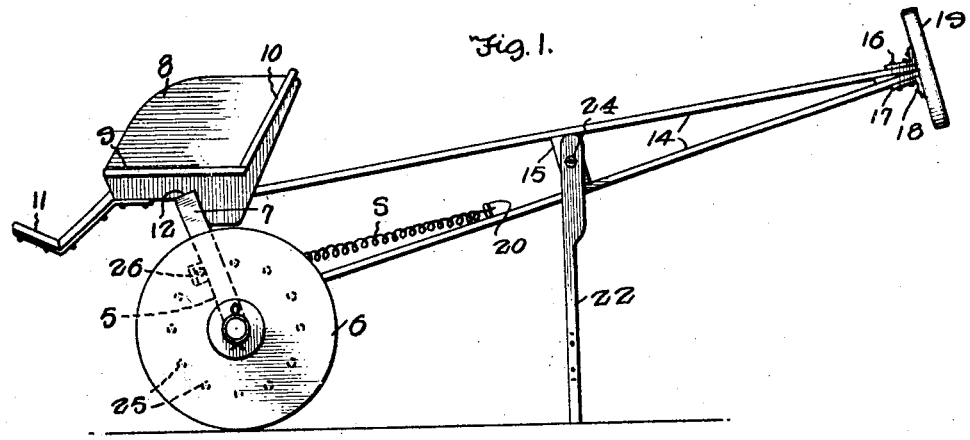
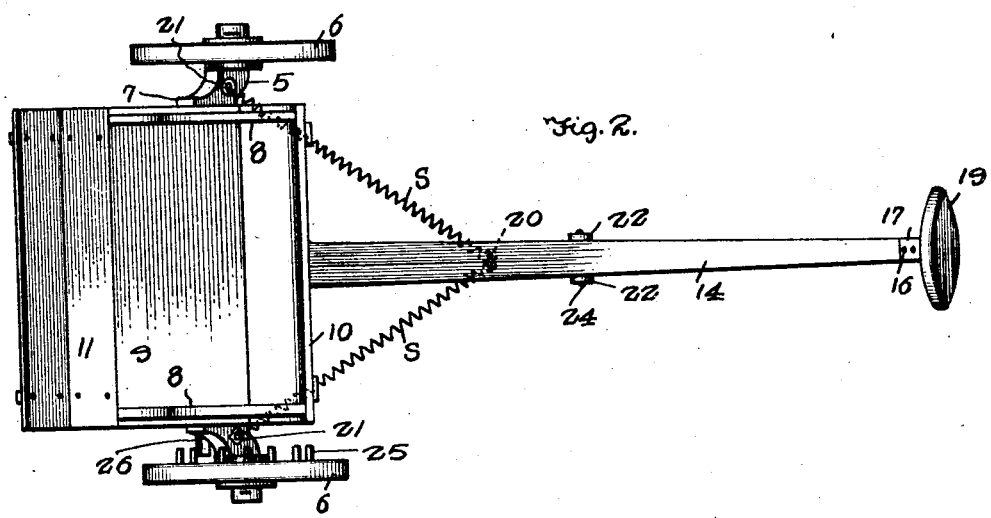
Oscar Peterson, Inventor Aug. 21, 1928.　　　　　　　　　　　　　　1,681,876
O. PETERSON
TOY PUSHCART
Filed Sept. 14, 1925　　　　2 Sheets-Sheet 2

Oscar Peterson, Inventor

Witnesses

Patented Aug. 21, 1928.

1,681,876

UNITED STATES PATENT OFFICE.

OSCAR PETERSON, OF DENT, MINNESOTA.

TOY PUSHCART.

Application filed September 14, 1925. Serial No. 56,335.

This invention relates to improvements in toy push carts, and has more particular reference to a device of this kind particularly adapted to constitute a child's vehicle.

The primary object of the invention is to provide a push cart of the above kind which is extremely simple and durable in construction.

A further important object of the invention is to provide a push cart of the above kind which may be readily steered by exerting a simple axial turning movement upon the handle of the device.

Other objects will appear as the nature of the invention is better understood, and the same consists in the novel form, combination and arrangement of parts hereinafter more fully described, shown in the accompanying drawings and claimed.

Figure 3:
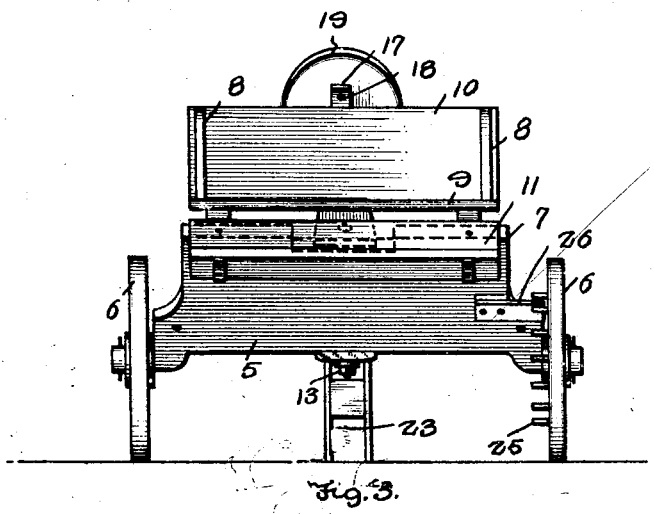
Figure 4:
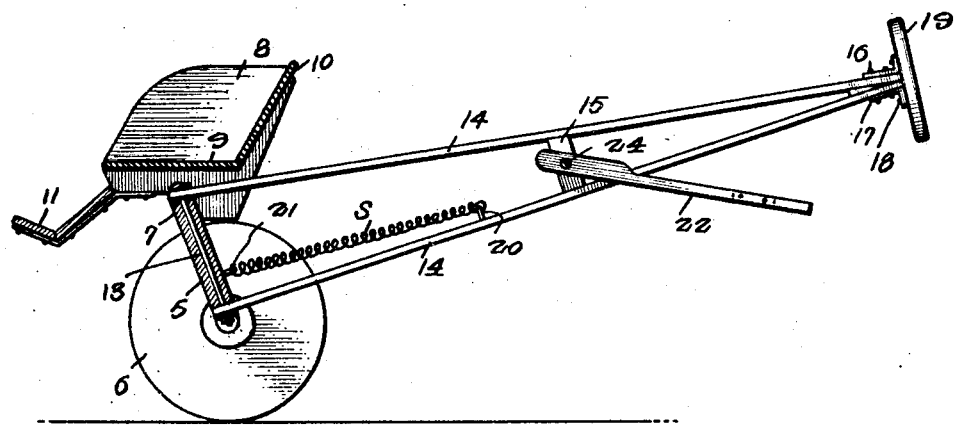

In the drawings, wherein like reference characters indicate corresponding parts throughout the several views, Figure 1 is a side elevational view of a push cart constructed in accordance with the present invention, Figure 2 is a top plan view thereof, Figure 3 is a front elevational view of the same, and Figure 4 is a view of the device shown in Figure 1, partly in side elevation and partly in longitudinal section.

Referring more in detail to the drawings, the present invention embodies a transverse axle 5 upon the ends of which are journaled supporting wheels 6. The axle 5 is preferably in the nature of a board having reduced ends upon which the wheels are journaled, and the intermediate portion of the axle has an upwardly projecting extension 7 upon the upper edge of which is seated and rigidly secured a seat for accommodating the occupants of the cart, which seat preferably embodies side boards 8, a seat bottom 9, a back rest 10 and a foot rest 11. As shown, the side boards 8 of the seat preferably project below the seat bottom 9 and have notches 12 in their lower edges in which the upper edge portion of the axle extension 7 is seated.

An upright king bolt 13 preferably extends through the central portion of the axle 5 so as to project above and below the latter as clearly shown in Figure 4. The device further embodies a handle composed of similar superimposed bars or strips 14 which are arranged in forwardly diverging relation and have their forward spaced ends pivoted upon the ends of the king bolt 13 substantially against the upper and lower edges of the axle 5. A brace block 15 is disposed between the intermediate portions of the handle forming strips 14, and the latter are secured to the block 15 by nailing or the like for strengthening the handle. The rear ends of the handle strips 14 are rigidly secured together in adjacent relation by means of bolts 16 or the like which also pass through angle braces 17 whose outer ends project in opposite directions and are rigidly secured by bolting or the like as at 18 to a steering disc or wheel 19. The steering wheel 19 is thus disposed with its axis coincident with the longitudinal axis of the handle.

From the above it is apparent that the axle 5 and parts carried thereby are free to turn relative to the handle for permitting steering of the cart either to the right or the left, and in order to maintain the axle 5 normally at right angles to the handle, helical tension springs are attached at adjacent ends as at 20 to the lower handle strip 14 rearwardly of the seat, the forward diverging or spaced ends of the springs being respectively attached to the opposite ends of the axle 5 as at 21. By simply turning the wheel 19 so as to exert an axial twisting or turning movement to the handle, the axle 5 will be caused to swing relative to the handle, so as to cause one wheel to move in advance of the other and thereby effect steering of the cart. Obviously, by turning the handle in one direction the cart may be steered to the right and by turning the handle in the opposite direction the vehicle may be steered to the left. The springs S will yieldingly permit the swinging movement of the axle 5 relative to the handle, and will also automatically return the axle to its normal position at right angles to the handle when the twisting or turning movement of the handle is discontinued. This enables the steering of the push cart without requiring lateral swinging movement of the handle, an objectionable feature of push carts wherein the handles are rigidly fastened to the axle. It is particularly noted that the handle is disposed at an inclination when the device is in use so that the pivot bolt 13 is tilted forwardly as shown in Figure 4. Thus, when the handle is turned, the supporting wheel at that side toward which the handle is turned, is forced rearwardly and the axle is accordingly swung about the pivot bolt 13 so that the other supporting wheel moves forwardly and both supporting wheels maintain engagement with the ground.

A prop is preferably carried by the intermediate portion of the handle for supporting the latter at an inclination and restraining the cart against movement when desired, and this prop preferably consists of a pair of strips 22 disposed in side by side spaced relation and rigidly connected adjacent their lower ends by means of a spacing block 23, the upper ends of the strips 22 being hinged as at 24 to opposite sides of the spacing block 15 of the handle. The hinges 24 are preferably made sufficiently tight so that the prop will retain any position to which it is swung under the action of friction between the strips 22 and the block 13, and by swinging the prop upwardly as shown in Figure 4, the same will be rendered inoperative so that forward traveling movement of the cart can be had without interference. The prop assumes a vertical position with its lower end engaging the ground as shown in Figure 1 when the vehicle is at rest.

If desired the wheel 6 at one side may be provided with a plurality of rigid inwardly projecting pins 25 arranged in a circular series coincident with the axis of the wheel, and a flexible strip 26 may be fastened to the adjacent end portion of the axle 5 so as to have its free end in the path of the pins 25 whereby upon travelling movement of the cart the strip 26 will be intermittently struck for causing a sounding noise for the amusement of the occupant of the cart.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:

1. A toy push cart, comprising a handle having a pair of super-imposed rigid members having their forward end portions in spaced relation, an axle normally disposed at an angle to the perpendicular and arranged transversely of the handle and having said spaced forward ends across the top and bottom edges intermediate the ends thereof and pivotally secured thereto, whereby axial turning movement of the attached handle will effect swinging of the axle and steering of the cart, and supporting wheels journaled upon the ends of the axle.

2. A toy push cart, comprising a handle having a pair of super-imposed rigid members having their forward end portions in spaced relation, an axle normally disposed at an angle to the perpendicular and arranged transversely of the handle and having said spaced forward ends extending across the top and bottom edges intermediate the ends thereof and pivotally secured thereto, whereby axial movement of the attached handle will effect swinging of the axle and steering of the cart, and supporting wheels journaled upon the ends of said axle, said axle having an upwardly projecting extension intermediate its ends and an occupant supporting seat secured to said extension.

3. A toy including a pair of traction wheels and a stationary axle connecting the wheels, said axle having a flat surface portion adapted to be disposed in inclined position as the toy is rolled over the ground, and a steering bar pivotally connected to the axle and having camming engagement with the inclined face thereof, to effect steering of the traction wheels.

In testimony whereof I affix my signature.

OSCAR PETERSON.